(12) United States Patent
Tanimura et al.

(10) Patent No.: US 10,578,491 B2
(45) Date of Patent: Mar. 3, 2020

(54) COLORIMETRY DEVICE AND COLORIMETRY METHOD

(71) Applicant: KONICA MINOLTA, INC., Chiyoda-ku (JP)

(72) Inventors: Yasutaka Tanimura, Nara (JP); Ryoji Bando, Sakai (JP); Koji Harada, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 237 days.

(21) Appl. No.: 15/558,450

(22) PCT Filed: Mar. 28, 2016

(86) PCT No.: PCT/JP2016/059791
§ 371 (c)(1),
(2) Date: Sep. 14, 2017

(87) PCT Pub. No.: WO2016/158812
PCT Pub. Date: Oct. 6, 2016

(65) Prior Publication Data
US 2018/0052052 A1 Feb. 22, 2018

(30) Foreign Application Priority Data
Apr. 1, 2015 (JP) ................................. 2015-075144

(51) Int. Cl.
*G06K 9/00* (2006.01)
*G01J 3/52* (2006.01)
(Continued)

(52) U.S. Cl.
CPC . *G01J 3/52* (2013.01); *G01J 3/10* (2013.01); *G01J 3/463* (2013.01); *G01J 3/465* (2013.01); *G01J 3/524* (2013.01)

(58) Field of Classification Search
CPC ...................................... G01J 3/52; G01J 3/10
See application file for complete search history.

(56) References Cited

U.S. PATENT DOCUMENTS

| 6,765,674 B2 | 7/2004 | Orelli et al. |
| 6,766,050 B1 * | 7/2004 | Saikawa ................. H04N 1/60 |
| | | 382/162 |

(Continued)

FOREIGN PATENT DOCUMENTS

| JP | 6-70345 | 3/1994 |
| JP | 2000-253262 | 9/2000 |

(Continued)

*Primary Examiner* — Feng Niu
(74) *Attorney, Agent, or Firm* — Cozen O'Connor

(57) ABSTRACT

In a colorimetry device and a colorimetry method of the present invention, reference chart definition information including at least reference chart identification information about a reference color chart and patch position definition information indicating a position of each of plurality of patches in the reference color chart is stored, and whether the obtained color chart is matched with the reference color chart is determined based on the reference chart identification information. When the obtained color chart is determined to be matched with the reference color chart, a position of a colorimetry unit with respect to the color chart is relatively moved to the position of each of the plurality of patches in the color chart based on the reference chart definition information, and the colorimetry unit measures the color of each of the plurality of patches.

8 Claims, 10 Drawing Sheets

(51) Int. Cl.
    *G01J 3/10*           (2006.01)
    *G01J 3/46*           (2006.01)

(56) References Cited

U.S. PATENT DOCUMENTS

| | | | |
|---|---|---|---|
| 7,020,331 B2 * | 3/2006 | Saikawa | H04N 1/60 348/223.1 |
| 8,634,640 B2 * | 1/2014 | Bhatti | G01J 3/462 382/167 |
| 9,671,289 B2 * | 6/2017 | Nagai | G01J 3/50 |
| 9,681,012 B2 * | 6/2017 | Goto | G01J 3/52 |
| 10,254,168 B2 * | 4/2019 | Harada | G01J 3/52 |
| 10,267,683 B2 * | 4/2019 | Tanimura | G01J 3/46 |
| 10,341,535 B2 * | 7/2019 | Muller | G01J 3/52 |
| 10,401,227 B2 * | 9/2019 | Harada | B41J 29/46 |
| 2002/0054292 A1 * | 5/2002 | Orelli | G01J 3/02 356/402 |
| 2013/0027720 A1 * | 1/2013 | Satoh | H04N 1/60 358/1.9 |
| 2017/0314994 A1 * | 11/2017 | Tanimura | G01J 3/46 |
| 2018/0045572 A1 * | 2/2018 | Harada | B41J 2/525 |
| 2018/0052052 A1 * | 2/2018 | Tanimura | G01J 3/52 |
| 2018/0080829 A1 * | 3/2018 | Tanimura | G01J 3/46 |

FOREIGN PATENT DOCUMENTS

| | | |
|---|---|---|
| JP | 2009-60221 | 3/2009 |
| WO | WO 2013/145295 | 10/2013 |

* cited by examiner

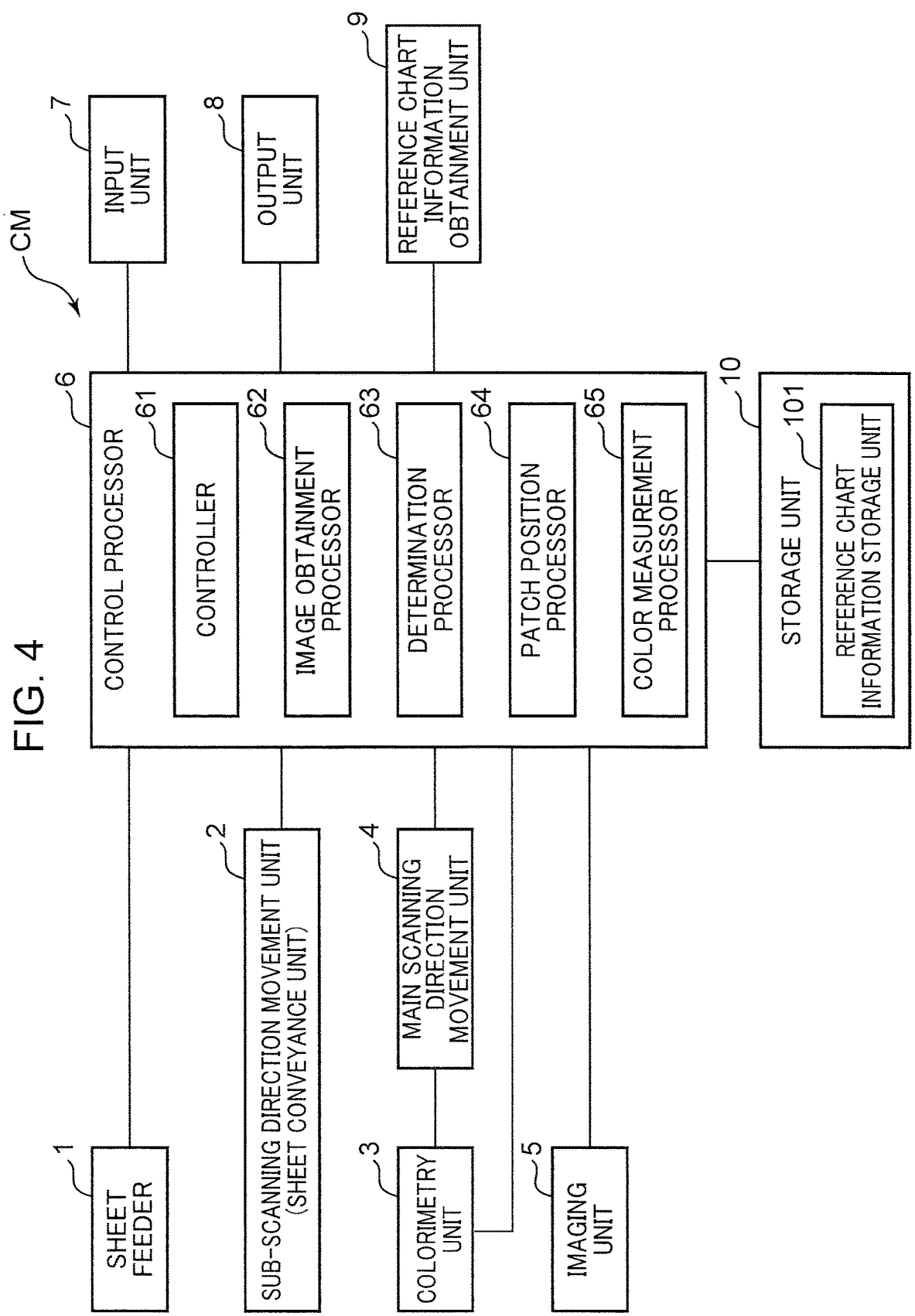

FIG. 7

| REFERENCE CHART IDENTIFICATION INFORMATION | REFERENCE CHART DEFINITION INFORMATION |
|---|---|
| REFERENCE CHART IDENTIFICATION INFORMATION ID1 | REFERENCE CHART DEFINITION INFORMATION RD1 |
| REFERENCE CHART IDENTIFICATION INFORMATION ID2 | REFERENCE CHART DEFINITION INFORMATION RD2 |
| ⋮ | ⋮ |
| ⋮ | ⋮ |
| REFERENCE CHART IDENTIFICATION INFORMATION IDk | REFERENCE CHART DEFINITION INFORMATION RDk |

EDGE LINE (−), INTERMEDIATE LINE (⋯), AND PATCH CENTER POSITION (○)

COLORIMETRY DEVICE AND COLORIMETRY METHOD

RELATED APPLICATIONS

This is a U.S. National Phase Application under 35 USC 371 of International Application PCT/JP2016/059791 filed on Mar. 28, 2016.

This application claims the priority of Japanese application no. 2015-075144 filed Apr. 1, 2015, the entire content of which is hereby incorporated by reference.

TECHNICAL FIELD

The present invention relates to a colorimetry device and a colorimetry method for measuring color, particularly to a colorimetry device and a colorimetry method for being able to automatically perform colorimetry at a proper position.

BACKGROUND ART

In a company, such as a printing company, which generates a color printed matter, color of the printed matter is periodically measured and color of a printing device that prints the printed matter is adjusted in order to keep quality of the printed matter. In the color adjustment of the printing device, for example, original image data called a color chart is printed by the printing device, and color of each patch in the printed color chart is measured by the colorimetry device. A color shift amount between a measured value of the color of each patch and a target value of the color of each patch is evaluated, and the color of the printing device is adjusted according to an evaluation result.

The color chart includes a plurality of color samples called the patches, each of the plurality of patches is formed by a different color (hue, lightness, and saturation) in many cases, and the plurality of patches are arrayed in a predetermined mode. There are various color charts. For example, there is a color chart having a mode formed by two-dimensionally arraying a plurality of square patches having various colors. In the color chart of the mode, there are various patterns. For example, the patches are arrayed such that a random color arrangement is obtained depending on a content to be evaluated, or the patches are arrayed such that a change in shade between the patches adjacent to each other is decreased like gradation. Not only such color charts are produced by a user using a color chart production tool provided from a manufacturer of the colorimetry device, but also the color charts are provided from a public institution. Thus, in the color chart, there are various patterns depending on a shape, a disposition, and a color scheme of the patch.

On the other hand, the number of colors used in the color adjustment of the printing device increases year by year, the number of patches disposed in the color chart also increases with increasing number of colors, and a size (area) of each patch is small.

Due to such circumstances, it is actually impossible that the colorimetry is performed while a measurement region of the colorimetry device is accurately positioned by hand with respect to each patch. Therefore, there is a demand for an automatic system, in which the position of each patch is automatically measured and the color of each patch is measured while the measurement region of the colorimetry device is automatically matched with the measured position of each patch. In Patent Literature 1, Gretag-Macbeth proposes a method as an example of the automatic system. In the method, a two-dimensional color image of the color chart to be measured is captured, the patch position is calculated by an image processing technique using a computer, and a colorimetry head is moved to the decided patch position to perform the colorimetry on the color chart.

When the colorimetry of each automatically-detected patch position is performed in adjusting the color of the printing device, sometimes the colorimetry device cannot automatically recognize all the patch positions with some cause such as a breakdown (abnormality) of the color chart due to a stain or damage in the actual color chart and the color chart having low contrast between the patches. Therefore, the patch position that cannot automatically be recognized is corrected by hand or another tool, for example, and chart definition information, in which patch attribute information such as information about the patch position and information about the patch color is described, is produced. The colorimetry device measures the color of each patch in the color chart based on the chart definition information. On the other hand, for the color chart in which all the patch positions cannot automatically be recognized, when the patch position is automatically recognized by the colorimetry device in the next color adjustment, there is a high possibility that all the patch positions cannot automatically be recognized again, and resultantly the correction is required again, and man-hour and labor are required.

CITATION LIST

Patent Literature

Patent Literature 1: U.S. Pat. No. 6,765,674

SUMMARY OF INVENTION

The present invention has been made in view of the above circumstances, and an object of the present invention is to provide a colorimetry device and a colorimetry method for being able to perform colorimetry of each patch at a more proper position even in the color chart in which the automatic recognition of the positions of all the patches is difficult be performed.

In a colorimetry device and a colorimetry method according to the present invention, reference chart definition information including at least reference chart identification information about a reference color chart and patch position definition information indicating a position of each of the plurality of patches in the reference color chart is stored, and whether the obtained color chart is matched with the reference color chart is determined based on the reference chart identification information. When the obtained color chart is determined to be matched with the reference color chart, a position of a colorimetry unit with respect to the color chart is relatively moved to the position of each of the plurality of patches based on the reference chart definition information, and the colorimetry unit measures the color of each of the plurality of patches in the color chart. Accordingly, the colorimetry device and colorimetry method of the present invention can perform the colorimetry of each patch at the more proper position even in the color chart in which the automatic recognition is hardly be performed on the positions of all the patches.

The above and other objects, features, and advantages of the present invention will appear more fully from the following detailed description and the accompanying drawings.

BRIEF DESCRIPTION OF DRAWINGS

FIG. 4 is a block diagram illustrating an electric configuration of the colorimetry device.

FIG. 7 is a view illustrating a reference chart information table stored in a reference chart information storage unit of the colorimetry device.

DESCRIPTION OF EMBODIMENT

Hereinafter, an embodiment of the present invention will be described with reference to the drawings. The same configuration is designated by the same reference sign in each drawing, and the overlapping description is omitted as appropriate. In the description, the configuration is designated by the reference sign without a subscript when generally named, and the configuration is designated by the reference sign with a subscript when individually referred to.

Figure 1:
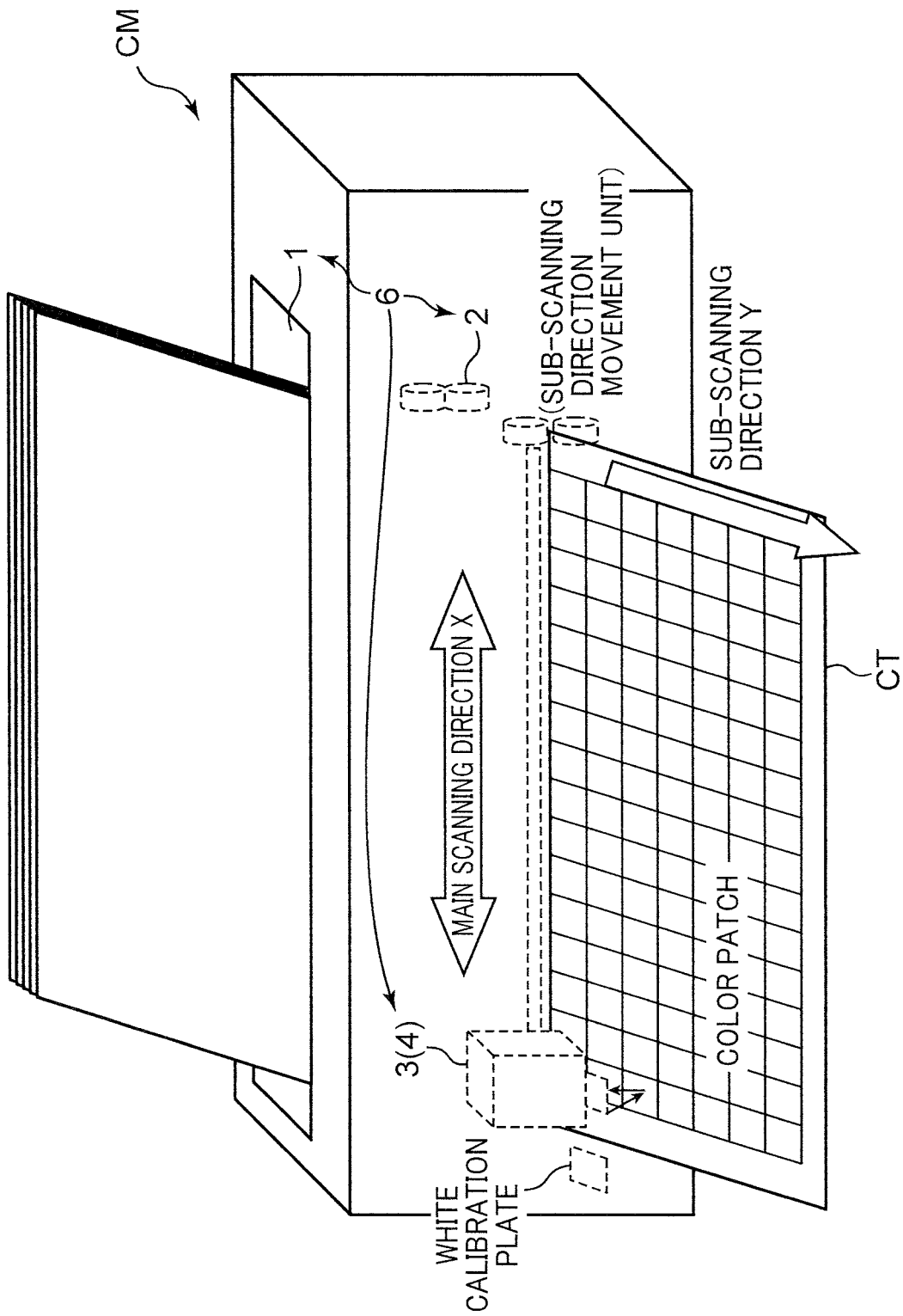
FIG. 1 is a perspective view illustrating a schematic configuration of a colorimetry device according to an embodiment.
Figure 2:
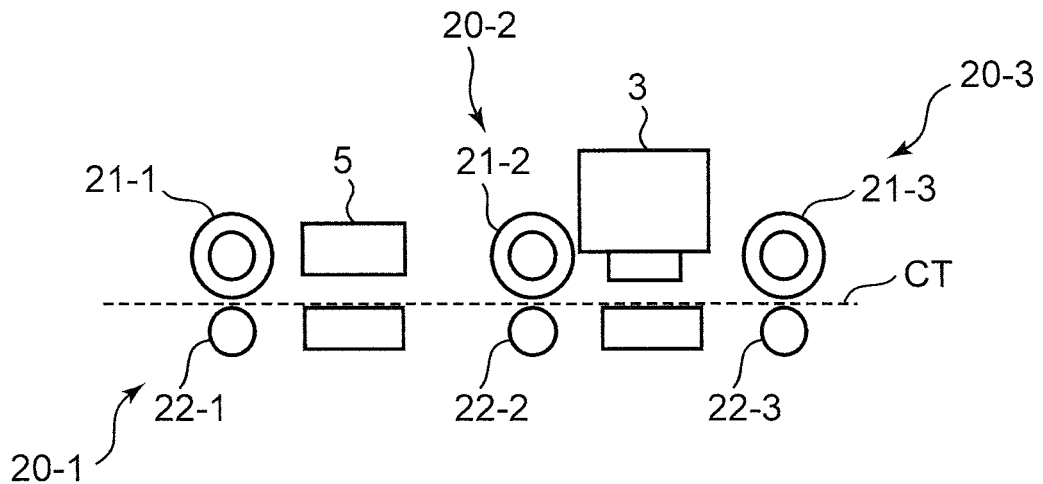
FIG. 2 is a schematic side view illustrating a disposition relationship between an imaging unit and a colorimetry unit in the colorimetry device.
Figure 3:
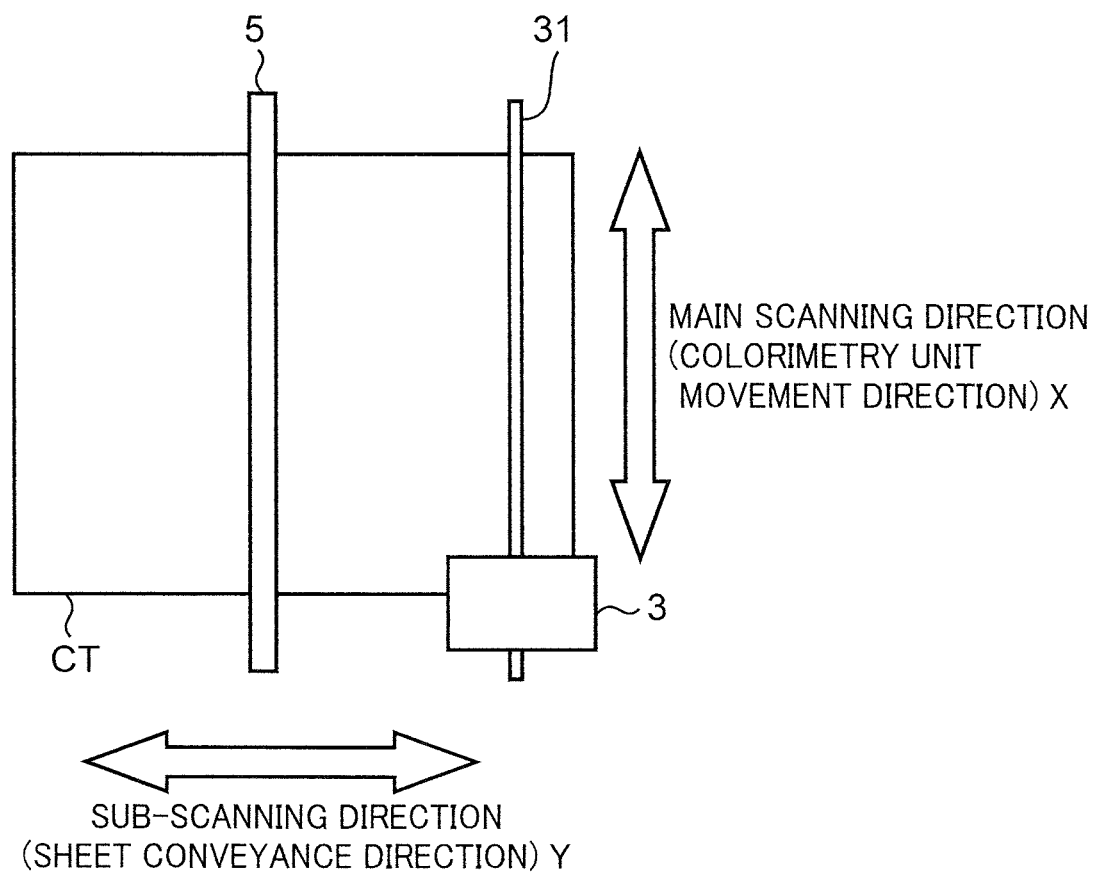
FIG. 3 is a schematic plan view illustrating the disposition relationship between the imaging unit and the colorimetry unit in the colorimetry device.
Figure 5A:
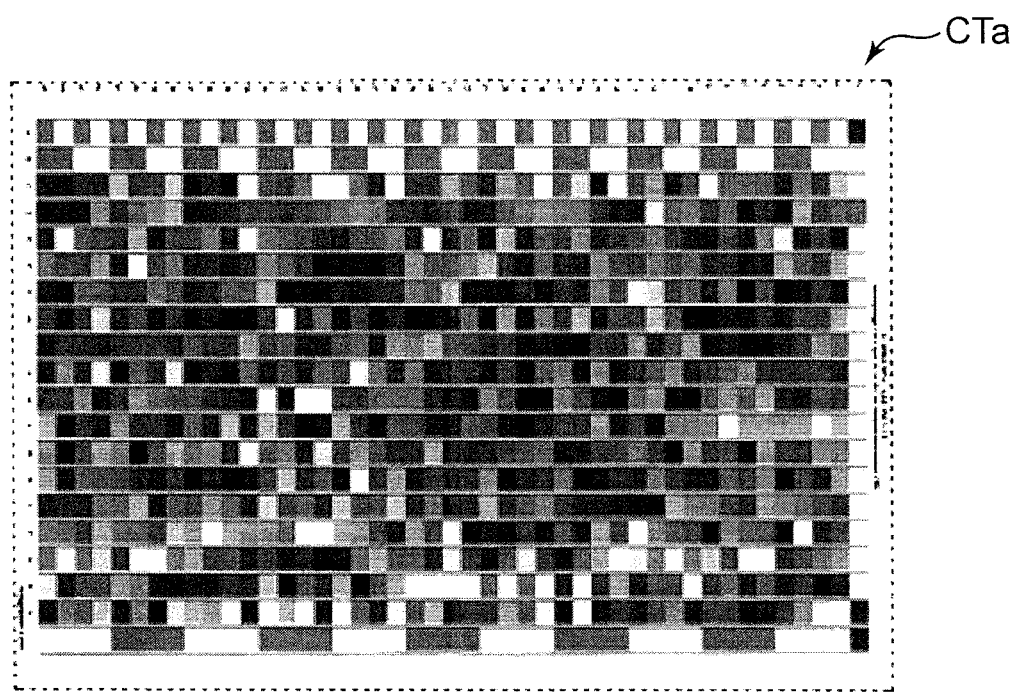
FIG. 5A and FIG. 5B are views illustrating color charts of first and second modes by way of example.
Figure 5B:
Figure 6A:
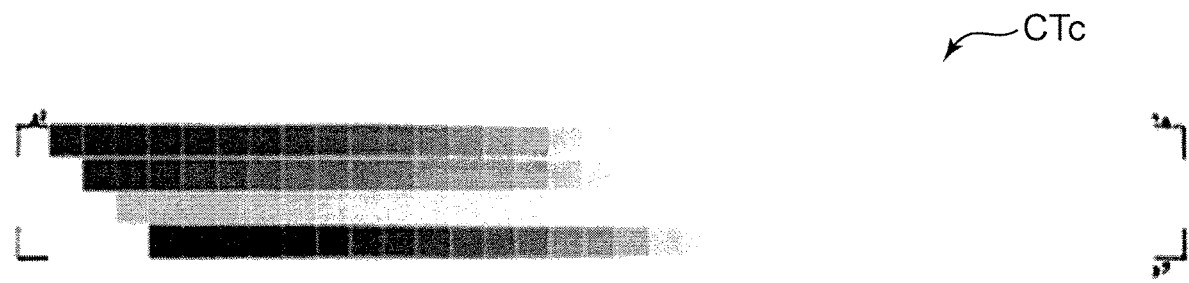
FIG. 6A and FIG. 6B are views illustrating color charts of third and fourth modes by way of example.
Figure 6B:

FIG. 1 is a perspective view illustrating a schematic configuration of a colorimetry device according to the embodiment. FIG. 2 is a schematic side view illustrating a disposition relationship between an imaging unit and a colorimetry unit in the colorimetry device according to the embodiment. FIG. 3 is a schematic plan view illustrating the disposition relationship between the imaging unit and the colorimetry unit in the colorimetry device according to the embodiment. FIG. 4 is a block diagram illustrating an electric configuration of the colorimetry device according to the embodiment. FIG. 5A and FIG. 5B are views illustrating color charts of first and second modes by way of example. FIG. 5A illustrates a color chart CTa of the first mode, and FIG. 5B illustrates a color chart CTb of the second mode. FIG. 6A and FIG. 6B are views illustrating color charts of third and fourth modes by way of example. FIG. 6A illustrates a color chart CTc of the third mode, and FIG. 6B illustrates a color chart CTd of the fourth mode. FIG. 7 is a view illustrating a reference chart information table stored in a reference chart information storage unit of the colorimetry device of the embodiment.

A colorimetry device CM of the embodiment measures color (hue, lightness, and saturation) of a measurement object that is a colorimetry target. For example, as illustrated in FIGS. 1 to 4, the colorimetry device CM includes a sheet feeder 1, a sub-scanning direction movement unit (sheet conveyance unit) 2, and a colorimetry unit 3, a main scanning direction movement unit 4, an imaging unit 5, a control processor 6, an input unit 7, an output unit 8, a reference chart information obtainment unit 9, and a storage unit 10.

The sheet feeder 1 is a sheet conveyance mechanism, which is connected to the control processor 6 and takes a sheet of the measurement object set in the colorimetry device CM into the colorimetry device CM under the control of the control processor 6. The sheet of the measurement object may be any sheet. However, for example, in the case that color of a printing device is adjusted, the sheet of the measurement object is a color chart CT including a plurality of patches that are predetermined color areas on a predetermined sheet. For example, a sheet feeder 1 includes a reservoir section in which the sheet of the measurement object is reserved, an intake unit including a pickup roller which picks up the sheet of the measurement object reserved in the reservoir section and takes the sheet of the measurement object in the colorimetry device CM, and a feed unit including a conveyance roller that conveys the sheet of the measurement object taken in by the intake unit to the sub-scanning direction movement unit 2.

The sub-scanning direction movement unit (sheet conveyance unit) 2 is a sheet conveyance mechanism, which is connected to the control processor 6 and conveys a predetermined amount of sheet of the measurement object conveyed from the sheet feeder 1 in response to a unit conveyance instruction (second unit conveyance instruction) in a sub-scanning direction (second direction) orthogonal to a first direction previously set as a main scanning direction under the control of the control processor 6. The sub-scanning direction movement unit 2 can convey the sheet of the measurement object forwardly and backwardly along the sub-scanning direction. For example, the forward conveyance means that the sheet of the measurement object is conveyed from an upstream (the side of the sheet feeder 1) to a downstream (discharge side), and the backward conveyance means that the sheet of the measurement object is conveyed in an opposite direction of the forward conveyance, namely, from the downstream to the upstream. For example, the sub-scanning direction movement unit 2 includes a plurality set of sheet conveyance rollers and a drive unit that rotates the sheet conveyance rollers. Each set of sheet conveyance rollers includes a driving roller rotated by the drive unit and a driven roller rotated according to the rotation of the driving roller. For example, the drive unit includes a stepping motor (sub-scanning stepping motor). In the sub-scanning direction movement unit 2 having the above configuration, when a one-pulse drive pulse (second drive pulse, an example of the second unit conveyance instruction) is input, the sub-scanning stepping motor is rotated by a predetermined angle (twenty-first angle), the driving roller is also rotated by a predetermined angle (twenty-second angle) by the rotation of the sub-scanning stepping motor, and the sheet of the measurement object is conveyed (moved) by a predetermined amount along the sub-scanning direction by the rotation of the driving roller. More specifically, in the example of FIG. 2, the sub-scanning direction movement unit 2 includes first to third sheet conveyance rollers 20-1 to 20-3. The first to third sheet conveyance rollers 20-1 to 20-3 are sequentially provided the upstream to the downstream along the sub-scanning direction. The first to third sheet conveyance rollers 20-1 to 20-3 respectively include first to third driving rollers 21-1 to 21-3 and first to third driven rollers 22-1 to 22-3. The first to third driving rollers 21-1 to 21-3 are driven by first to third stepping motors (not illustrated) that are rotated in synchronization with one another. In the forward conveyance, the sheet of the measurement object conveyed from the sheet feeder 1 is nipped between a pair of a first driving roller 21-1 and a first driven roller 22-1, and the first driving roller 21-1 is normally (for example, clockwise) rotated by the drive unit, whereby the sheet of the measurement object is conveyed from the first sheet conveyance roller 20-1 to the second sheet conveyance roller 20-2. The sheet of the measurement object conveyed to the second sheet conveyance roller 20-2 is similarly conveyed from the second sheet conveyance roller 20-2 to the third sheet conveyance roller 20-3 by the second sheet conveyance roller 20-2. The sheet of the measurement object conveyed to the third sheet conveyance roller 20-3 is similarly conveyed from the third sheet conveyance roller 20-3 to the downstream by the third sheet conveyance roller 20-3. In the backward conveyance, contrary to the forward conveyance, the first to third driving rollers 21-1 to 21-3 are reversely (in the above example, counterclockwise) rotated by the drive unit, thereby conveying the sheet of the measurement object from the downstream to the upstream.

Hereinafter, the main scanning direction (first direction) is an X-direction (horizontal direction), a coordinate axis set along the X-direction is an X-axis, the sub-scanning direction (second direction) is a Y-direction (vertical direction), and a coordinate axis set along the Y-direction is a Y-axis, and these are used as appropriate.

The colorimetry unit 3 is connected to the control processor 6, and measures the color of the measurement object under the control of the control processor 6. For example, the colorimetry unit 3 is a colorimetry sensor that obtains predetermined optical information about the measurement object in order to obtain the color of the measurement object. For example, the colorimetry unit 3 includes a spectroscopic optical element and a photoelectric conversion element, which measures reflectance (or transmittance) of each wavelength, and the colorimetry unit 3 is a spectroscopic colorimeter that measures color of an object based on the reflectance (or transmittance) of each wavelength. For example, the colorimetry unit 3 includes an optical filter and a photoelectric conversion element, which measures tristimulus values of RGB, and the colorimetry unit 3 is a tristimulus value type colorimeter that measures the color of the object based on a color difference of tristimulus values. In the colorimetry unit 3, what is called a white calibration plate (reference white plate) indicated by a broken line in FIG. 1 is measured, the white calibration plate being able to reflect a wavelength of a measurement range with high reflectance (for example, about 90% to about 99%), thereby performing white calibration.

The main scanning direction movement unit 4 is a movement mechanism, which is connected to the control processor 6 and moves the colorimetry unit 3 in each predetermined amount in response to a predetermined unit conveyance instruction (first unit conveyance instruction) in the main scanning direction (first direction) under the control of the control processor 6. For example, the main scanning direction movement unit 4 includes a guide member that guides the colorimetry unit 3, a feed mechanism, such as a rack and pinion and a feed screw, which moves the colorimetry unit 3 while the colorimetry unit 3 is guided by the guide member, and a feed mechanism drive unit, such as a stepping motor (the main scanning stepping motor), which drives the feed mechanism. For example, as illustrated in FIG. 3, the main scanning direction movement unit 4 includes a rack 31 extending along the main scanning direction and having a gear cut in a flat-plate rod, and a pinion (not illustrated) that is provided in the colorimetry unit 3 and rotated by the main scanning stepping motor, and the pinion and the rack 31 engage each other. In the main scanning direction movement unit 4 having the above configuration, when a one-pulse drive pulse (first drive pulse, an example of the first unit conveyance instruction) is input, the main scanning stepping motor is rotated by a predetermined angle (eleven angle), the pinion is also rotated by a predetermined angle (twelfth angle) by the rotation of the main scanning stepping motor, and the colorimetry unit 3 is moved by a predetermined amount in the main scanning direction along the rack 31 by the rotation of the pinion.

The imaging unit 5 is connected to the control processor 6, and images the optical image of the object under the control of the control processor 6. For example, the imaging unit 5 includes a line sensor (linear image sensor) in which a plurality of photoelectric conversion elements are arrayed along one direction. As illustrated in FIG. 3, the one direction that is of the array direction of the plurality of photoelectric conversion elements is matched with the main scanning direction (X-direction), and the imaging unit 5 is provided so as to extend along the main scanning direction (X-direction).

As illustrated in FIG. 2, the imaging unit 5 is provided between the first sheet conveyance roller 20-1 and the second sheet conveyance roller 20-2, and the colorimetry unit 3 and the main scanning direction movement unit 4 are provided such that the colorimetry unit 3 moves along the main scanning direction between the second sheet conveyance roller 20-2 and the third sheet conveyance roller 20-3. The imaging unit 5 images the sheet of the measurement object in each one line along the main scanning direction (X-direction) while the sub-scanning direction movement unit 2 conveys the sheet of the measurement object in the sub-scanning direction (Y-direction), thereby generating an image (image data) of the sheet of the measurement object. When the sub-scanning direction movement unit 2 conveys the sheet of the measurement object in the sub-scanning direction (Y-direction), a relative position Y of the sheet of the measurement object and the colorimetry unit 3 can be changed in the sub-scanning direction. When the main scanning direction movement unit 4 moves the colorimetry unit 3 in the main scanning direction (X-direction), a relative position X of the sheet of the measurement object and the colorimetry unit 3 can be changed in the main scanning direction. Therefore, the colorimetry unit 3 can move to any position (X,Y) on the sheet of the measurement object and measure the color of the position (X,Y).

Thus, in the embodiment, the colorimetry unit 3 can move only in the main scanning direction by the main scanning direction movement unit 4 with respect to the sheet of the measurement object. On the other hand, the sub-scanning direction movement unit (sheet conveyance unit) 2 moves the sheet of the measurement object along the sub-scanning direction. Accordingly, in the embodiment, the main scanning direction movement unit 4 and the sub-scanning direction movement unit 2 correspond to an example of the movement unit that relatively moves the position of the colorimetry unit with respect to the sheet of the measurement object.

The input unit 7 is connected to the control processor 6, and inputs various commands such as a command issuing an instruction to measure the color of the measurement object and various pieces of data, such as an identifier of the measurement object, which are necessary for the colorimetry, to the colorimetry device CM. For example, the input unit 7 is a plurality of input switches to which predetermined functions are allocated. The output unit 8 is connected to the control processor 6, and outputs the command or data input from the input unit 7 and the color of the measurement object, the color of the measurement object being measured by the colorimetry device CM, under the control of the control processor 6. For example, the output unit 8 is a display device such as a CRT display, LCD, and an organic EL display, or a printing device such as a printer.

The input unit 7 and the output unit 8 may be configured with a touch panel. In the case that the input unit 7 and the output unit 8 are configured with the touch panel, for example, the input unit 7 is a resistance film type or electrostatic capacitance type position input device that detects and inputs an operation position, and the output unit 8 is a display device. In the touch panel, the position input device is provided on a display surface of the display device, and a candidate of one or more input contents is displayed on the display device. When a user touches the display position where the input content to be input is displayed, the position input device detects the display position, and the display content displayed at the detected position is input to the colorimetry device CM as the operation input content of the user. In the touch panel, the colorimetry device CM easily dealt with by the user is provided because the user intuitively easily understands the input operation.

The storage unit 10 is connected to the control processor 6, and various predetermined programs and various predetermined pieces of data are stored in the storage unit 10 under the control of the control processor 6. The various predetermined programs include control processing programs such as a colorimetry program performing for the colorimetry of the measurement object, and a position measurement program for obtaining each patch position in the color chart CT in the case that the measurement object is the color chart CT. The various predetermined pieces of data include the reference chart identification information and the chart definition information.

The reference color chart is a color chart including a plurality of patches that are of a predetermined color region, the color chart being referred to as a representative example of a color chart having patch position definition information indicating the previously-prepared patch position. There are various kinds of color charts as described above, and a plurality of kinds of reference color charts may exist according to the plurality kinds of color charts. For example, as illustrated in FIG. 5A, a color chart CTa of a first mode has a first disposition pattern in which the plurality of patches are arrayed in a random color arrangement such that a circumscribed figure (contour figure) of one chart region constructed with the plurality of patches becomes a quadrangle. The plurality of patches exist in the chart region. The color chart CTa of the first mode is one of the reference color charts, and the patch position definition information in the color chart CTa of the first mode is previously produced and prepared. For example, as illustrated in FIG. 5B, a color chart CTb of a second mode includes the plurality of patches, which are arrayed in a gradation color arrangement such that a circumscribed figure (contour figure) of one chart region becomes a quadrangle. The color chart CTb of the second mode includes a second disposition pattern including a black, rod-shape width position detection bar indicating a width of the chart region along the main scanning direction on one side (in the example of FIG. 5B, an upper side of a paper surface) outside the chart region and black, rhombic row position detection markers indicating the position of each row of the patch in the sub-scanning direction on both sides facing each other (in the example of FIG. 5B, right and left side of the paper surface) of the chart region outside the chart region. That is, in the second disposition pattern, the patches are disposed in an inside region surrounded by the width position detection bar and the row position detection markers. The color chart CTb of the second mode is another one of the reference color charts, and the patch position definition information in the color chart CTb of the second mode is previously produced and prepared. For example, as illustrated in FIG. 6A, a color chart CTc of a third mode includes the plurality of patches, which are arrayed in a gradation color arrangement such that a circumscribed figure (contour figure) of one chart region becomes a long quadrangle. The color chart CTc of the third mode includes a third disposition pattern including an end marker, such as an L-shape, which indicates an end of the chart region at the end of the chart region. That is, in the third disposition pattern, the patches are disposed in an inside region surrounded by the end markers. The color chart CTc of the third mode is still another one of the reference color charts, and the patch position definition information in the color chart CTc of the third mode is previously produced and prepared. For example, as illustrated in FIG. 6B, a color chart CTd of a fourth mode includes the images and the color charts in a mixed manner, and the color chart CTd includes each patch in a first disposition pattern like the color chart CTa of the first mode. The color chart CTd of the fourth mode is yet another one of the reference color charts, and the patch position definition information in the color chart CTd of the fourth mode is previously produced and prepared.

The reference chart identification information identifies and specifies the reference color chart. Example of the reference chart identification information includes an image of the reference color chart or predetermined feature information indicating a feature of the reference color chart. For example, the feature information is obtained through image processing (including halfway image processing) performed on the image of the reference color chart when the patch position is obtained from the image of the reference color chart as described later. Examples of the feature information include an edge image of the reference color chart, a contour line of the patch, and the color (hue, lightness, and saturation) of the patch.

The reference chart definition information is information in which attribute information, such as patch position definition information indicating the prepared patch position and information about the patch color, which is related to the patch in the reference color chart, is described. The reference chart definition information includes at least the patch position definition information. The colorimetry device CM performs processing of obtaining patch position measurement information (patch position processing) (to be described later) on the color chart CT selected as the reference color chart, the patch position measurement information is obtained, and the obtained patch position measurement information is set to the patch position definition information, whereby the reference chart definition information is automatically generated. In this case, the position of the patch that is not recognized by the automatic recognition is corrected by a manually operation or using a predetermined tool, for example, and the patch position is incorporated in the patch position definition information. Alternatively, the patch position is obtained by hand from beginning with respect to the color chart CT selected as the reference color chart, and set to the patch position definition information, thereby generating the reference chart definition information.

The storage unit 10 functionally includes a reference chart information storage unit 101 in which the reference chart identification information and the chart definition information are stored. In the embodiment, for example, as illustrated in FIG. 7, the reference chart identification information and the chart definition information are stored in the reference chart information storage unit 101 in a table formed while the reference chart identification information and the chart definition information are correlated with each other in each reference color chart. A reference chart information table 11 shown in FIG. 7 includes a reference chart identification information field 111 in which the reference chart identification information is registered and a reference chart definition information field 112 in which the reference chart definition information is registered, and a record is produced in each kind of reference chart. In the example of FIG. 7, there are k (k is an integer of 2 or more) reference color charts. The reference chart identification information may be registered in the reference chart identification information field 111, or a file name of a file (reference chart identification information file) in which the reference chart identification information is stored may be registered in the reference chart identification information field 111. Similarly, the reference chart definition information may be registered in the reference chart definition information field 112, or a file name of a file (reference chart definition information file) in which the reference chart definition information is stored may be registered in the reference chart definition information field 112.

The storage unit 10 includes a ROM (Read Only Memory) that is of a nonvolatile storage element or an EEPROM (Electrically Erasable Programmable Read Only Memory) that is of a rewritable, nonvolatile storage element. The storage unit 10 includes a RAM (Random Access Memory) that serves as what is called a working memory of the control processor 6. The working memory stores data generated during the execution of the predetermined program.

The reference chart information obtainment unit 9 obtains the reference chart identification information and the reference chart definition information from the outside. The colorimetry device CM includes the reference chart information obtainment unit 9 instead of or in addition to the reference chart information storage unit 101 of the storage unit 10. More specifically, for example, the reference chart information obtainment unit 9 is a communication interface circuit that transmits and receives a communication signal to and from an external device through a communication line (network) according to a predetermined communication protocol. For example, the reference chart information obtainment unit 9 is a LAN (Local Area Network) card, a data communication card, or the like. The reference chart information obtainment unit 9 receives a communication signal in which the reference chart identification information and the reference chart definition information are accommodated as data from a server device or a network storage, which manages the reference chart identification information and the reference chart definition information, through the communication line. Then, the reference chart information obtainment unit 9 takes out the data from the received communication signal, converts the taken-out data into data having a form that can be processed by the control processor 6, and outputs the data to the control processor 6. The reference chart information obtainment unit 9 generates a communication signal in which the data to be transferred, which is input from the control processor 6, is stored according to the communication protocol used in the communication line, and the reference chart information obtainment unit 9 may transmit the generated communication signal to another external device (including the server device or the network storage) through the communication line. For example, the reference chart information obtainment unit 9 is an interface circuit that inputs and outputs data to and from an external device in which the reference chart identification information and the reference chart definition information are recorded. Example of the reference chart information obtainment unit 9 includes an RS-232C interface circuit that is of a serial communication system, an interface circuit in which a Bluetooth (registered trademark) standard is used, an interface circuit that conducts infrared communication of an IrDA (Infrared Data Association) standard, and an interface circuit in which a USB (Universal Serial Bus) standard is used. The data includes the reference chart identification information and the reference chart definition information. For example, the reference chart information obtainment unit 9 is a flexible disk drive or a CD-R (Compact Disc Recordable) drive, which writes and reads data in and from a predetermined recording medium, such as a flexible disk and CD-R, in which the reference chart identification information and the reference chart definition information are recorded.

The control processor 6 controls each unit of the colorimetry device CM according to the function of the unit, and obtains the color of the measurement object. For example, the control processor 6 includes a CPU (Central Processing Unit) and a peripheral circuit of the CPU. A controller 61, an image obtainment processor 62, a determination processor 63, a patch position processor 64, and a color measurement processor 65 are functionally constructed by execution of the control processing program in the control processor 6.

The controller 61 controls each unit of the colorimetry device CM according to a function of the unit.

The image obtainment processor 62 obtains the image in the sheet of the measurement object such as the color chart CT using the imaging unit 5. More specifically, in the embodiment, because the imaging unit 5 includes a line sensor, the imaging unit 5 images the sheet of the measurement object while the sub-scanning direction movement unit (sheet conveyance unit) 2 conveys the sheet of the measurement object such as the color chart CT, whereby the image obtainment processor 62 obtains the image of the sheet of the measurement object.

The determination processor 63 determines whether the color chart CT obtained by the image obtainment processor 62 is matched with the reference color chart within a predetermined range, based on the reference chart identification information. The reference chart identification information may be stored in the reference chart information storage unit 101 or obtained from the outside by the reference chart information obtainment unit 9. More specifically, the reference chart identification information is at least one of the image of the reference color chart or feature information about the reference color chart, and the determination processor 63 determines whether the color chart CT obtained by the image obtainment processor 62 is matched with the reference color chart within a predetermined range based on a result of comparison between the color chart CT obtained by the image obtainment processor 62 and the reference color chart using at least one of the image and the feature information. More particularly, for example, the determination processor 63 obtains a correlating value of at least one of the image and the feature information to compare the color chart CT obtained by the image obtainment processor 62 and the reference color chart, and determines whether the correlating value falls within a previously-set predetermined range (or greater than or equal to a previously-set predetermined threshold), thereby determining whether the color chart CT obtained by the image obtainment processor 62 is matched with the reference color chart. A known technique generally used in similar image retrieval is used in the processing of comparing the color chart CT and the reference color chart. In one example, the determination processor 62 obtains a difference in pixel value between the image of the color chart CT and the image of the reference color chart at an identical pixel position in each pixel position, obtains a sum of the differences at the pixel positions, and uses the obtained sum as the correlating value. In one example, the determination processor 62 obtains a difference in feature information between the color chart CT and the reference color chart, and uses the obtained difference as the correlating value.

In the embodiment, the determination processor 63 adjusts a size of at least one of the image and the feature information in the color chart CT obtained by the image obtainment processor 62 and the reference color chart such that the sizes of the image and the feature information are equal to each other before the comparison between the color chart CT obtained by the image obtainment processor 62 and the reference color chart using at least one of the image and the feature information. For example, the determination processor 63 adjusts the size by variably magnifying (expansion or reduction) one of the image and the feature information. In one example, the determination processor 63 obtains the size of the color chart CT obtained by the image obtainment processor 62, and variably magnifies the image of the color chart CT obtained by the image obtainment processor 62 such that the image of the color chart CT becomes the size of the reference color chart. In one example, the determination processor 63 obtains the size of the color chart CT obtained by the image obtainment processor 62, and variably magnifies the feature information about the color chart CT obtained by the image obtainment processor 62 such that the size of the color chart CT becomes the size of the reference color chart.

In the embodiment, the determination processor 63 adjusts a direction of at least one of the image and the feature information in the color chart CT obtained by the image obtainment processor 62 and the reference color chart such that the directions of the image and the feature information are equal to each other before the comparison between the color chart CT obtained by the image obtainment processor 62 and the reference color chart using at least one of the image and the feature information. For example, the determination processor 63 adjusts the direction by rotating one of the image and the feature information. In one example, the determination processor 63 obtains an inclination of the color chart CT obtained by the image obtainment processor 62, and rotates the image of the color chart CT obtained by the image obtainment processor 62 such that the inclination of the reference color chart is eliminated.

The patch position processor 64 obtains patch position measurement information indicating a patch position (that is, the patch position), based on the image of the color chart CT obtained by the image obtainment processor 62. More specifically, for example, the patch position processor 64 generates binary horizontal edge image data and binary vertical edge image data for the horizontal direction (the main scanning direction, the X-direction) and the vertical direction (the sub-scanning direction, the Y-direction) by binarizing the image of the color chart CT with an edge filter used to detect an edge extending in one direction in the image, detects a horizontal edge line and a vertical edge line for the horizontal direction and the vertical direction by performing a Hough transform on the generated binary horizontal edge image data and binary vertical edge image data, and obtains a coordinate value (X,Y) of an intersection as patch position measurement information while each intersection in an intermediate line is set to each patch position. Preferably a plurality of disposition patterns in the chart region of the color chart CT are previously stored in the storage unit 10, the patch position processor 64 determines the disposition pattern corresponding to the color chart CT obtained by the image obtainment processor 62 from the plurality of disposition patterns previously stored in the storage unit 10, and detects the chart region from the image of the color chart CT obtained by the image obtainment processor 62 based on the determined disposition pattern, and obtains the patch position measurement information with respect to the detected chart region.

When the determination processor 63 determines that the color chart CT is matched with the reference color chart, the color measurement processor 65 relatively moves the position of the colorimetry unit 3 with respect to the color chart CT to each of the plurality of patch positions in the color chart CT based on the reference chart definition information, and the colorimetry unit 3 measures the color of each of the plurality of patches in the color chart CT. When the determination processor 63 determines that the color chart CT is not matched with the reference color chart, the color measurement processor 65 relatively moves the position of the colorimetry unit 3 with respect to the color chart CT to each of the plurality of patch positions in the color chart CT based on the patch position measurement information obtained by the patch position processor 64 using the sub-scanning direction movement unit 2 and the main scanning direction movement unit 4, and the colorimetry unit 3 measures the color of each of the plurality of patches in the color chart CT.

Figure 8:
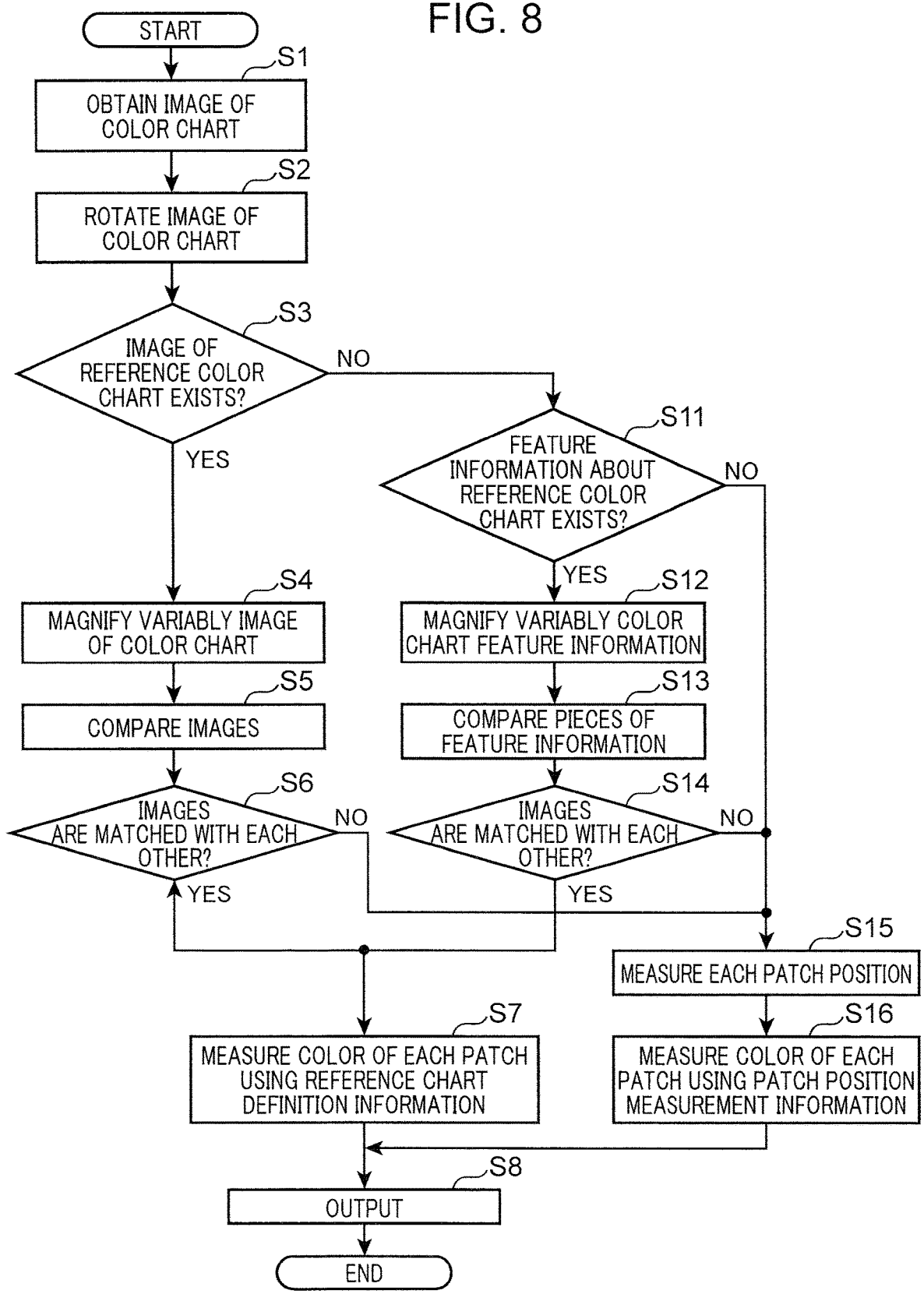
FIG. 8 is a flowchart illustrating a schematic operation of the colorimetry device.
Figure 9:
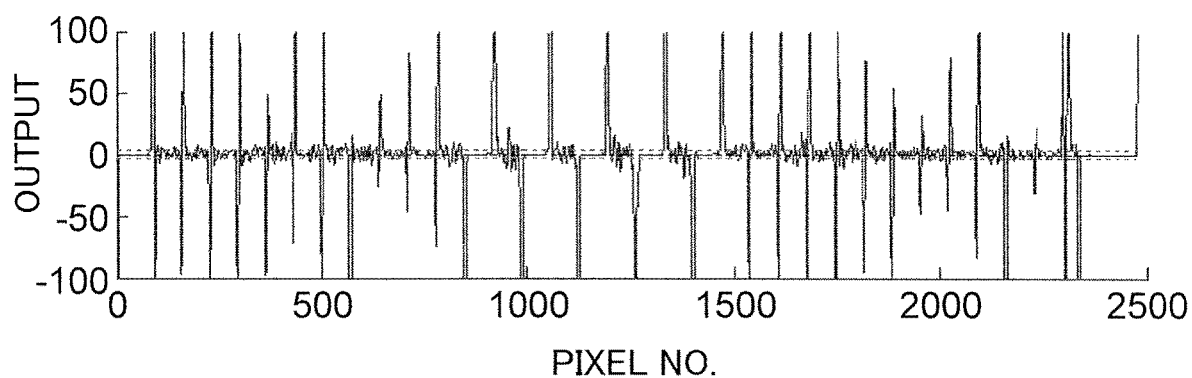
FIG. 9 is a view illustrating an example of a result of differential filtering, which is performed on an image of a certain position in a Y-direction at differential intervals of N points along a horizontal direction with respect to the color chart in FIG. 5A.
Figure 10:
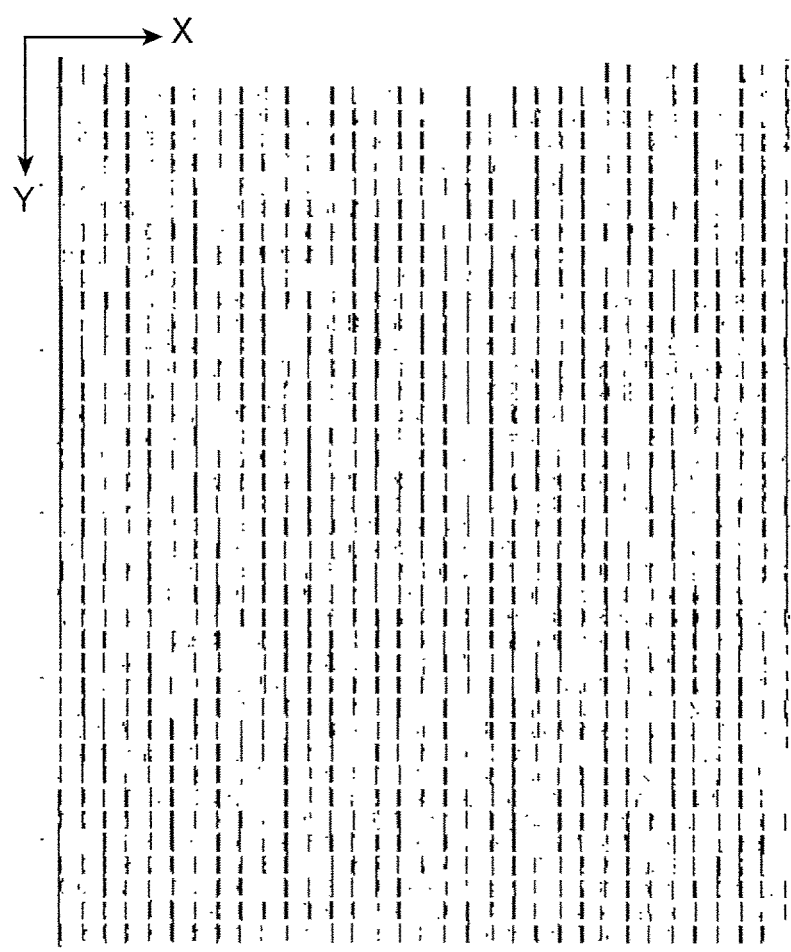
FIG. 10 is a view illustrating a binary vertical edge image of the color chart by way of example.
Figure 11:
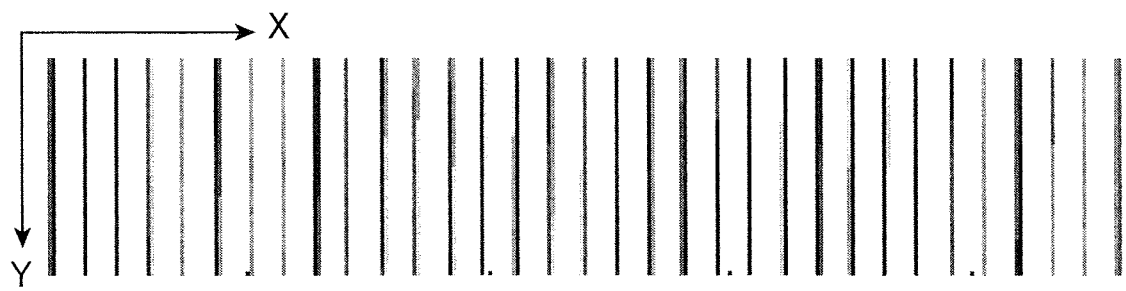
FIG. 11 is a view illustrating a part of a vertical edge line of the color chart by way of example.
Figure 12:
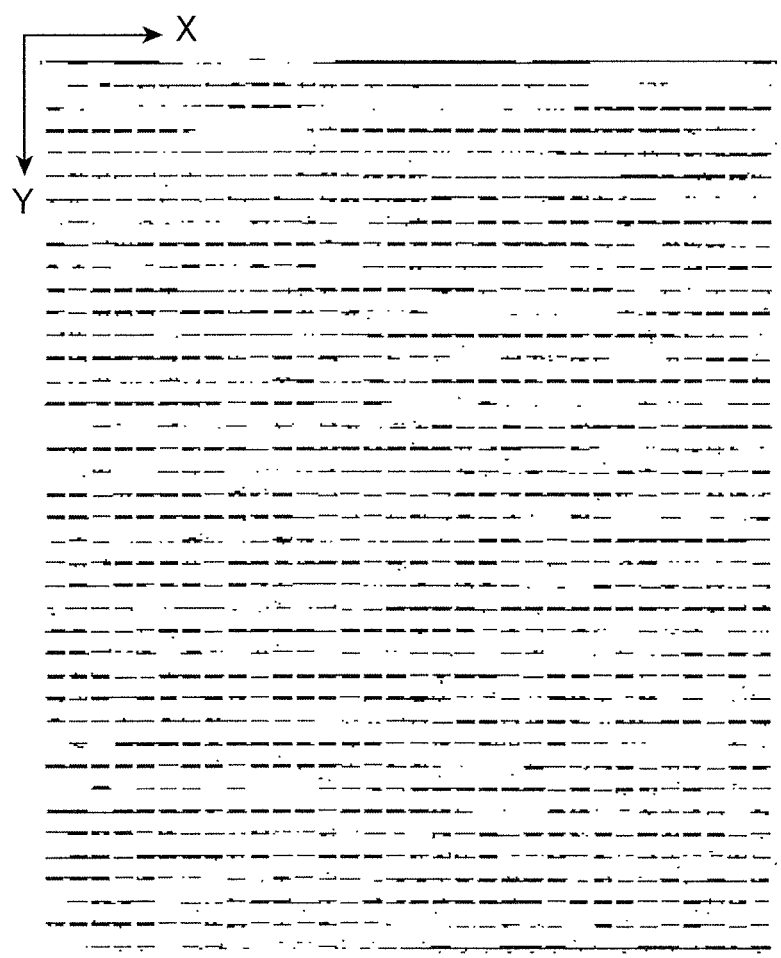
FIG. 12 is a view illustrating a binary horizontal edge image of the color chart by way of example.
Figure 13:
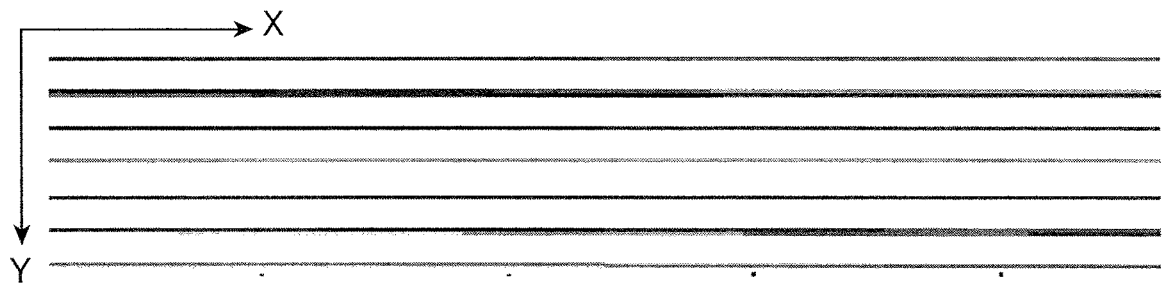
FIG. 13 is a view illustrating a part of a horizontal edge line of the color chart by way of example.
Figure 14:
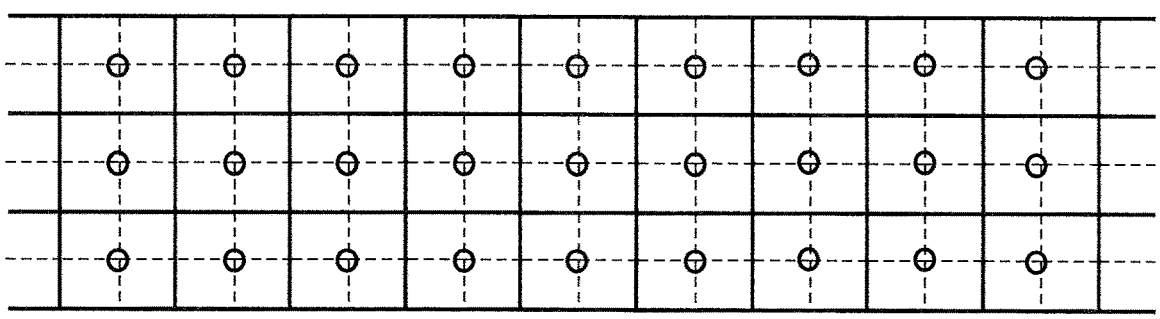
FIG. 14 is a view illustrating a part of each patch position obtained from the vertical edge line and the horizontal edge line of the color chart by way of example.

An operation of the colorimetry device of the embodiment will be described below. FIG. 8 is a flowchart illustrating a schematic operation of the colorimetry device of the present embodiment. FIG. 9 is a view illustrating an example of a result of differential filtering, which is performed on an image of a certain position in a Y-direction at differential intervals of N points along a horizontal direction with respect to the color chart in FIG. 5A. FIG. 10 is a view illustrating a binary vertical edge image of the color chart by way of example. FIG. 11 is a view illustrating a part of a vertical edge line of the color chart by way of example. FIG. 12 is a view illustrating a binary horizontal edge image of the color chart by way of example. FIG. 13 is a view illustrating a part of a horizontal edge line of the color chart by way of example. FIG. 14 is a view illustrating a part of each patch position obtained from the vertical edge line and the horizontal edge line of the color chart by way of example. In FIG. 14, a solid line indicates the vertical edge line or the horizontal edge line, a broken line indicates an intermediate line between the vertical edge lines or an intermediate line between the horizontal edge lines, and a mark "o" indicates a measured patch position.

When measuring the color of each patch of the color chart CT, the colorimetry device CM of the embodiment is roughly operated as follows. The color chart CT is set in the sheet feeder 1, and the input unit 7 issues an instruction to start the color measurement of the color chart CT. At this point, in the colorimetry device CM, a whole image of the color chart CT is obtained in the forward conveyance by the image obtainment processor 62 as illustrated in FIG. 8 (S1, an image obtainment processing step). More specifically, the image obtainment processor 62 of the control processor 6 images the color chart CT in each line along the main scanning direction (X-direction) using the imaging unit 5 in synchronization with the conveyance in the sub-scanning direction while conveying forward the color chart CT in the sub-scanning direction (Y-direction) from one end to other end of the sheet of the color chart CT using the sub-scanning direction movement unit 2, thereby obtaining the whole image of the color chart CT.

Then, in the colorimetry device CM, the determination processor 63 of the control processor 6 rotates at least one of the image and the feature information in the color chart CT obtained by the image obtainment processor 62 and the reference color chart, thereby performing the adjustment such that the image and the feature information become identical to each other (S2, a direction adjustment processing step). More specifically, for example, in the embodiment, the determination processor 63 detects one end (end side) in the sheet of the color chart CT obtained by the image obtainment processor 62 through edge detection image processing, obtains an angle formed with the horizontal direction (X-direction) (or vertical direction (Y-direction)) in the one end (end side), namely, an angle of the inclination in the sheet of the color chart CT obtained by the image obtainment processor 62, and rotates the image of the color chart CT obtained by image obtainment processor 62 based on the obtained angle of the inclination such that the inclination is eliminated in the sheet of the color chart CT obtained by the image obtainment processor 62.

Then, the colorimetry device CM determines whether the image of the reference color chart exists using the determination processor 63 of the control processor 6 (S3). When the reference chart identification information is the image of the reference color chart, because the image of the reference color chart is stored in the reference chart information storage unit 101 as the reference chart identification information, the determination that the image of the reference color chart exists is made (Yes) and processing S4 is performed. On the other hand, processing S11 is performed when the determination that the image of the reference color chart does not exist is made (No).

In processing S4, in the colorimetry device CM, the determination processor 63 of the control processor 6 variably magnifies the size of at least one of the image and the feature information in the color chart CT obtained by the image obtainment processor 62 and the reference color chart, thereby performing the adjustment such that the image and the feature information become identical to each other (a size adjustment processing step). More specifically, for example, in the embodiment, the determination processor 63 detects each end (each end side) in the sheet of the color chart CT obtained by the image obtainment processor 62 through edge detection image processing, obtains the size of the sheet of the color chart CT obtained by the image obtainment processor 62, and variably magnifies the image of the color chart CT obtained by image obtainment processor 62 such that the size of the color chart CT becomes the size of the reference color chart (image size adjustment processing step). In the case that the reference chart definition information includes information (size information) about the size of the reference color chart, the determination processor 63 performs the variable magnification based on the size information. On the other hand, in the case that the reference chart definition information does not include the size information about the reference color chart, the determination processor 63 performs the variable magnification with a previously-set predetermined variable magnification ratio, compares the post-variable-magnification image of the color chart CT obtained by the image obtainment processor 62 to the image of the reference color chart, and searches the variable magnification ratio having the highest degree of coincidence, thereby determining the final variable magnification ratio to perform the variable magnification.

Next to the processing S4, in the colorimetry device CM, the determination processor 63 of the control processor 6 compares the post-variable-magnification image of the color chart CT obtained by the image obtainment processor 62 to the image of the reference color chart as the reference chart identification information (S5, an image comparison processing step). More specifically, for example, in the embodiment, determination processor 63 obtains a difference in pixel value between the post-variable-magnification image of the color chart CT and the image of the reference color chart at an identical pixel position in each pixel position with respect to the image of the reference color chart stored in the reference chart information storage unit 101, and obtains a sum of the differences at the pixel positions as the correlating value, thereby comparing the post-variable-magnification color chart CT and the reference color chart.

Next to the processing S5, in the colorimetry device CM, the determination processor 63 of the control processor 6 determines whether the color chart CT obtained by the image obtainment processor 62 is matched with the reference color chart within a predetermined range (S6, a determination processing step). More specifically, for example, in the embodiment, determination processor 63 determines whether the correlating value obtained by the comparison falls within a previously-set predetermined range (or greater than or equal to a previously-set predetermined threshold), thereby determining whether the color chart CT obtained by the image obtainment processor 62 is matched with the reference color chart.

Processing S7 is performed when the color chart CT is matched with the reference color chart (Yes). On the other hand, processing S15 is performed when the color chart CT is not matched with the reference color chart (No).

In the processing S7, in the colorimetry device CM, based on the reference chart definition information corresponding to the reference color chart determined to be matched with the color chart CT obtained by the image obtainment processor 62, the color measurement processor 65 of the control processor 6 relatively moves the position of the colorimetry unit 3 with respect to the color chart CT to each of the plurality of patch positions in the color chart CT using the sub-scanning direction movement unit 2 and the main scanning direction movement unit 4, and measures the color of each of the plurality of patches in the color chart CT using the colorimetry unit 3 (a color measurement step based on the patch position definition information).

In the colorimetry device CM, when the color measurement processor 67 performs the colorimetry of the final patch, the controller 61 of the control processor 6 outputs the measured color of the patch to the output unit 8, and the processing is ended (S8, an output step). As needed, the controller 61 of the control processor 6 may output the measured color of the patch to an external device through the reference chart information obtainment unit 9.

On the other hand, when the image of the reference color chart does not exist as a result of the processing S3 (No), the processing S11 is performed as described above. In the processing S11, the colorimetry device CM determines whether the feature information about the reference color chart exists using the determination processor 63 of the control processor 6. In the case that the reference chart identification information is the feature information about the reference color chart, because the feature information about the reference color chart is stored in the reference chart information storage unit 101 as the reference chart identification information, the determination that the feature information about the reference color chart exists is made (Yes), and processing S12 is performed. On the other hand, the determination that the feature information about the reference color chart does not exist is made (No), processing S15 is performed.

In processing S12, in the colorimetry device CM, the determination processor 63 of the control processor 6 variably magnifies the size of at least one of the image and the feature information in the color chart CT obtained by the image obtainment processor 62 and the reference color chart, thereby performing the adjustment such that the image and the feature information become identical to each other (a size adjustment processing step). More specifically, for example, in the embodiment, the determination processor 63 obtains the feature information about the color chart CT obtained by the image obtainment processor 62. Then, the determination processor 63 detects each end (each end side) of the sheet of the color chart CT obtained by the image obtainment processor 62 through the edge detection image processing, thereby obtaining the size of the sheet of the color chart CT obtained by the image obtainment processor 62. Alternatively, the determination processor 63 obtains the size of the obtained feature information about the color chart CT. The determination processor 63 variably magnifies the feature information about the color chart CT obtained by the image obtainment processor 62 such that the size of the color chart CT becomes the size of the reference color chart (a feature information size adjustment processing step). In the case that the reference chart definition information includes the size information about the reference color chart, the determination processor 63 performs the variable magnification based on the size information. On the other hand, in the case that the reference chart definition information does not include the size information about the reference color chart, the determination processor 63 performs the variable magnification with a previously-set predetermined variable magnification ratio, compares the post-variable-magnification feature information about the color chart CT obtained by the image obtainment processor 62 to the feature information about the reference color chart, and searches the variable magnification ratio having the highest degree of coincidence, thereby determining the final variable magnification ratio to perform the variable magnification.

Next to the processing S12, in the colorimetry device CM, the determination processor 63 of the control processor 6 compares the post-variable-magnification feature information about the color chart CT obtained by the image obtainment processor 62 to the feature information about the reference color chart as the reference chart identification information (S13, a feature information comparison processing step). More specifically, for example, in the embodiment, the determination processor 63 obtains, as a correlating value, a difference between the post-variable-magnification feature information about the color chart CT and the feature information about the reference color chart with respect to the feature information about the reference color chart stored in the reference chart information storage unit 101, thereby comparing the post-variable-magnification feature information about the color chart CT and the feature information about the reference color chart.

Next to the processing S13, in the colorimetry device CM, the determination processor 63 of the control processor 6 determines whether the color chart CT obtained by the image obtainment processor 62 is matched with the reference color chart within a predetermined range (S14, a determination processing step). More specifically, for example, in the embodiment, determination processor 63 determines whether the correlating value obtained by the comparison falls within a previously-set predetermined range (or greater than or equal to a previously-set predetermined threshold), thereby determining whether the color chart CT obtained by the image obtainment processor 62 is matched with the reference color chart.

When the color chart CT is matched with the reference color chart (Yes), processing S7 and processing S8 are performed, and the processing is ended. On the other hand, processing S15 is performed when the color chart CT is not matched with the reference color chart (No).

In the processing S15, the colorimetry device CM obtains the patch position measurement information (patch position) indicating the patch position based on the image of the color chart CT obtained by the image obtainment processor 62 with respect to each of the plurality of patches using the patch position processor 64 of the control processor 6, and stores the obtained patch position measurement information in the storage unit 10 (a patch position processing step).

More specifically, for example, in the embodiment, the patch position processor 64 detects a vertical edge along the vertical direction (Y-direction) using a predetermined vertical edge detection edge filter, based on the whole image of the color chart CT obtained by the image obtainment processor 62, and detects a horizontal edge along the horizontal direction (X-direction) using a predetermined horizontal edge detection edge filter. FIG. 9 illustrates an example of a result of differential filtering, which is performed on an image of a certain position in the Y-direction at differential intervals of N points along the X-direction with respect to the color chart in FIG. 5A. Then, the patch position processor 64 obtains an absolute value of the vertical edge after the edge filtering, compares the obtained absolute value to a previously set threshold, and binarizes the obtained absolute value, thereby generating image data of a binary vertical edge. For example, when the processing result after the edge filtering is binarized with respect to the image of the color chart CTa in FIG. 5A, the image data of the binary vertical edge image in FIG. 10 is generated. Similarly, the patch position processor 64 obtains an absolute value of the horizontal edge after the edge filtering, compares the obtained absolute value to a previously set threshold, and binarizes the obtained absolute value, thereby generating image data of a binary horizontal edge. For example, when the processing result after the edge filtering is binarized with respect to the image of the color chart CTa in FIG. 5A, the image data of the binary horizontal edge image in FIG. 12 is generated. Then, the patch position processor 64 performs the Hough transform on the image data of the binary vertical edge and the image data of the binary horizontal edge in the color chart CT, and detects the vertical edge line and the horizontal edge line. For example, when the Hough transform is performed on the image data of the binary vertical edge of the color chart CTa in FIG. 10, the vertical edge line in FIG. 11 is detected. For example, when the Hough transform is performed on the image data of the binary horizontal edge of the color chart CTa in FIG. 12, the horizontal edge line in FIG. 13 is detected. The patch position processor 64 obtains a vertical intermediate line that is of an intermediate line between the vertical edge lines adjacent to each other in each of the plurality of vertical edge lines, and similarly obtains a horizontal intermediate line that is of an intermediate line between the horizontal edge lines adjacent to each other in each of the plurality of horizontal edge lines, and obtains an intersection of each of the plurality of vertical intermediate lines and each of the plurality of horizontal intermediate lines as the patch position (X, Y). For example, the vertical intermediate line indicated by a broken line in FIG. 14 is obtained when the vertical intermediate line is obtained based on the vertical edge line obtained for the color chart CTa in FIG. 5A, the horizontal intermediate line indicated by a broken line in FIG. 14 is obtained when the horizontal intermediate line is obtained based on the horizontal edge line, and each intersection of the vertical intermediate line and the horizontal intermediate line is obtained as the patch position (X,Y) as indicated by a mark "o" in FIG. 14. In the embodiment, the position (X, Y) of each patch becomes the patch position measurement information.

Examples of the feature information include the vertical edge or horizontal edge after the edge filtering, the binary vertical edge or binary horizontal edge after the binarization, and the vertical edge line or horizontal edge line after the Hough transform, which are obtained through the processing of obtaining the patch position.

The pieces of processing of obtaining the patch position measurement information may be performed after the chart region is detected. In the processing of detecting the chart region, the disposition pattern corresponding to the color chart CT obtained by the image obtainment processor 62 is determined from the plurality of disposition patterns previously stored in the storage unit 10, and the chart region is detected from the image of the color chart CT obtained by the image obtainment processor 62 based on the determined disposition pattern. Alternatively, a user may designate the chart region using the input unit 7.

Next to the processing S15, in the colorimetry device CM, the color measurement processor 65 of the control processor 6 relatively moves the position of the colorimetry unit 3 with respect to the color chart CT to each of the plurality of patch positions in the color chart CT, based on the patch position measurement information obtained by the patch position processor 64, using the sub-scanning direction movement unit 2 and the main scanning direction movement unit 4, the colorimetry unit 3 measures the color of each of the plurality of patches in the color chart CT (a color measurement step based on the patch position measurement information), and the processing S8 is performed.

In the embodiment, the processing of determining whether the color chart CT obtained by the image obtainment processor is matched with the reference color chart is performed by comparing the image of the color chart CT and the image of the reference color chart or by comparing the feature information about the color chart CT and the feature information about the reference color chart. Alternatively, the processing may be performed by comparing the images and the pieces of feature information. For example, whether the color chart CT obtained by the image obtainment processor is matched with the reference color chart is determined based on the comparison result of the images and the comparison result of the pieces of feature information, the determination that the color chart CT is matched with the reference color chart is made by the comparison of the images, and the determination that the color chart CT is matched with the reference color chart is made by the comparison of the pieces of feature information. At this point, the determination that the color chart CT obtained by the image obtainment processor is matched with the reference color chart is made.

In the embodiment, the directions of the color chart and the reference color chart are adjusted by rotating the image of the color chart CT obtained by the image obtainment processor. Alternatively, the directions of the color chart and the reference color chart may be adjusted by rotating the image of the reference color chart. The directions of the color chart and the reference color chart may be adjusted by rotating the feature information about the color chart or the feature information about the reference color chart.

In the embodiment, the sizes of the color chart and the reference color chart are adjusted by variably magnifying the image of the color chart CT obtained by the image obtainment processor. Alternatively, the sizes of the color chart and the reference color chart may be adjusted by variably magnifying the image of the reference color chart. In the embodiment, the sizes of the color chart and the reference color chart are adjusted by variably magnifying the feature information about the color chart CT obtained by the image obtainment processor. Alternatively, the sizes of the color chart and the reference color chart may be adjusted by variably magnifying the feature information about the reference color chart.

Thus, the color chart CT obtained by the image obtainment processor can be maintained in a state in the obtainment by rotating or variably magnifying the reference color chart, and the colorimetry in the processing S7 or S16 can be performed in the state.

As described above, in the colorimetry device CM of the embodiment and the colorimetry method mounted in the colorimetry device CM, the reference chart identification information and reference chart definition information in the reference color chart are previously prepared, the movement unit relatively moves the position of the colorimetry unit 3 with respect to the color chart CT to each of the patch positions in the color chart CT based on the reference chart definition information when the color chart CT obtained by the image obtainment processor 62 is determined to be matched with the reference color chart, and the colorimetry unit 3 measures the color of each of the patches in the color chart CT. Accordingly, even in the color chart CT in which all the patch positions are difficult to automatically recognize, the chart definition information is generated by performing the automatic recognition and the correction once, or the chart definition information is generated by hand from the beginning, and the color chart CT and the chart definition information are set to the reference color chart and the reference chart definition information. Therefore, in the colorimetry device CM of the embodiment and the colorimetry method mounted in the colorimetry device CM, the colorimetry of each patch can be performed at a more proper position in the color chart CT in which all the patch positions are difficult to automatically recognize and the substantially identical (substantially identical kind of) color chart CT.

In the colorimetry device CM of the embodiment and the colorimetry method mounted in the colorimetry device CM, in the case that the image of the reference color chart exists as the reference chart identification information, because the images are directly compared to each other, whether the color chart CT is matched with the reference color chart can accurately be determined. In the colorimetry device CM of the embodiment and the colorimetry method mounted in the colorimetry device CM, in the case that the feature information about the reference color chart exists as the reference chart identification information, because generally a data amount of the feature information is less than a data amount of the image, a storage capacity of the reference chart information storage unit 101 can be decreased, and an information processing amount of the processing of comparing the color chart CT and the reference color chart can also be decreased in the determination processor 63. In the case that the image and feature information of the reference color chart are compared to the image and feature information of the color chart CT as the modification, because the comparison is performed using the image and the feature information, whether the color chart CT is matched with the reference color chart can more accurately be determined.

In the colorimetry device CM of the embodiment and the colorimetry method mounted in the colorimetry device CM, because the sizes of the color chart CT obtained by the image obtainment processor 62 and the reference color chart are adjusted before the color chart CT is compared to the reference color chart, even if the sizes of the color chart CT and the reference color chart differ from each other, the color chart CT can be compared to the reference color chart, and whether the color chart CT is matched with the reference color chart can more accurately be determined. When the color chart CT is produced by printing electronic data on the sheet using the printing device, sometimes the size deviates from a specified value due to a characteristic of the printing device. Even in such cases, the color chart CT can be compared to the reference color chart, and whether the color chart CT is matched with the reference color chart can more accurately be determined.

In the colorimetry device CM of the embodiment and the colorimetry method mounted in the colorimetry device CM, because the directions of the color chart CT obtained by the image obtainment processor 62 and the reference color chart are adjusted before the color chart CT is compared to the reference color chart, even if the directions of the color chart CT and the reference color chart differ from each other, the color chart CT can be compared to the reference color chart, whether the color chart CT is matched with the reference color chart can more accurately be determined. When the image of the color chart CT is obtained by the image obtainment processor 62, sometimes the sheet is inclined in setting the color chart CT to the sheet feeder 1, or the sheet is inclined from the Y-direction during the conveyance. Even in such cases, the color chart CT can be compared to the reference color chart, and whether the color chart CT is matched with the reference color chart can more accurately be determined.

In the colorimetry device CM of the embodiment and the colorimetry method mounted in the colorimetry device CM, because the patch position processor 64 is further included, the colorimetry of each patch can be performed at a proper position even in the color chart CT of a kind that is not prepared as the reference color chart.

In the colorimetry device CM of the embodiment and the colorimetry method mounted in the colorimetry device CM, because the reference chart information obtainment unit 9 is included, the reference chart information obtainment unit 9 can obtain the reference chart identification information and the reference chart definition information from the outside. Therefore, the reference chart information storage unit 101 can be eliminated or the storage capacity of the reference chart information storage unit 101 can be decreased. Even after the colorimetry device CM is released, a manufacturer can provide the reference chart identification information and the reference chart definition information to a user through a storage medium or a network.

In the embodiment, the colorimetry device CM includes the imaging unit 5 including the line sensor in which the plurality of photoelectric conversion elements are arrayed in one direction. Alternatively, instead of the imaging unit 5, the colorimetry device CM may include an imaging unit including an area sensor (two-dimensional image sensor) in which the plurality of photoelectric conversion elements are two-dimensionally arrayed in two directions (for example, two directions orthogonal to each other) linearly independent of each other. The imaging unit including the area sensor can take the whole image of the color chart CT without conveying the color chart CT.

In the embodiment, the movement of the position of colorimetry unit 3 with respect to the sheet of the measurement object is performed by the movement of the colorimetry unit 3 along the main scanning direction using the main scanning direction movement unit 4 and by the movement of the sheet of the measurement object along the sub-scanning direction using the sub-scanning direction movement unit 2. However, the present invention is not limited to the above. Alternatively, for example, the movement unit that relatively moves the position of colorimetry unit 3 with respect to the sheet of the measurement object may be a movement mechanism that moves the colorimetry unit 3 in the main scanning direction and the sub-scanning direction with respect to the sheet of the measurement object placed on the stage in a resting state or an XY-stage that moves in the main scanning direction and the sub-scanning direction with respect to the fixed colorimetry unit 3 while the sheet of the measurement object is placed on the XY-stage. For example, the movement unit may move the colorimetry unit 3 in one of the main scanning direction and the sub-scanning direction, and move the stage in the other direction. The imaging unit including the area sensor is suitable for the movement unit having this configuration.

The description discloses technologies of various modes as described above, and the main technologies are summarized as follows.

According to an aspect, a colorimetry device includes: a colorimetry unit that measures color; an imaging unit that obtains an image; a movement unit that relatively moves a position of the colorimetry unit with respect to the sheet of the measurement object; a reference chart information storage unit in which reference chart definition information is stored, the reference chart definition information including at least reference chart identification information and patch position definition information, the reference chart identification information identifying and specifying a reference color chart including a plurality of patches each of which is a region of a predetermined color, the patch position definition information indicating a position of each of the plurality of patches in the reference color chart; an image obtainment processor that obtains an image of a color chart including a plurality of patches each of which is a region of a predetermined color using the imaging unit; a determination processor that determines whether the color chart obtained by the image obtainment processor is matched with the reference color chart based on the reference chart identification information; and a color measurement processor that relatively moves the position of the colorimetry unit with respect to the color chart to the position of each of the plurality of patches using the movement unit based on the reference chart definition information, and measures color of each of the plurality of patches using the colorimetry unit, when the determination processor determines that the color chart is matched with the reference color chart.

In the colorimetry device, the reference chart identification information and reference chart definition information in the reference color chart are previously prepared, the movement unit relatively moves the position of the colorimetry unit with respect to the color chart to each of the plurality of patch positions in the color chart based on the reference chart definition information when the color chart obtained by the image obtainment processor is determined to be matched with the reference color chart, and the colorimetry unit measures the color of each of the plurality of patches. Accordingly, even in the color chart in which all the patch positions are difficult to automatically recognize, the chart definition information is generated by performing the automatic recognition and the correction once, or the chart definition information is generated by hand from the beginning, and the color chart and the chart definition information are set to the reference color chart and the reference chart definition information. Therefore, in the colorimetry device, the colorimetry of each patch can be performed at a more proper position in the color chart in which all the patch positions are difficult to automatically recognize and the substantially identical (substantially identical kind of) color chart.

According to another aspect, in the colorimetry device, the reference chart identification information is at least one of an image of the reference color chart and feature information indicating a feature of the reference color chart, and the determination processor determines whether the color chart obtained by the image obtainment processor is matched with the reference color chart based on a result of comparison between the color chart obtained by the image obtainment processor and the reference color chart using at least one of the image and the feature information. Preferably, in the colorimetry device, the feature information is obtained through image processing (including halfway image processing) performed on the image of the reference color chart when the patch position is obtained from the reference color chart. Examples of the feature information include an edge image of the reference color chart, a contour line of the patch, and the color (hue, lightness, and saturation) of the patch. Preferably, in the colorimetry device, the determination processor obtains a correlating value of at least one of the image and the feature information to compare the color chart obtained by the image obtainment processor and the reference color chart, and determines whether the correlating value falls within a previously-set predetermined range (or greater than or equal to a previously-set predetermined threshold), thereby determining whether the color chart obtained by the image obtainment processor is matched with the reference color chart. Preferably, in the colorimetry device, the determination processor obtains a difference in pixel value between the image of the color chart and the image of the reference color chart at an identical pixel position in each pixel position, obtains a sum of the differences at the pixel positions, and uses the obtained sum as the correlating value. Preferably, in the colorimetry device, the determination processor obtains a difference in feature information between the color chart and the reference color chart, and uses the obtained difference as the correlating value.

In the colorimetry device, in the case that the image of the reference color chart is compared to the image of the color chart, because the images are directly compared to each other, whether the color chart is matched with the reference color chart can accurately be determined. In the colorimetry device, in the case that the feature information about the reference color chart is compared to the feature information about the color chart, because generally a data amount of the feature information is less than a data amount of the image, the storage capacity of the reference chart information storage unit can be decreased, and an information processing amount of the processing of comparing the color chart and the reference color chart can also be decreased in the determination processor. In the colorimetry device, in the case that the image and feature information of the reference color chart are compared to the image and feature information of the color chart, because the comparison is performed using the image and the feature information, whether the color chart is matched with the reference color chart can more accurately be determined.

According to another aspect, in the colorimetry device, the determination processor adjusts a size of at least one of the image and the feature information in the color chart obtained by the image obtainment processor and the reference color chart such that the sizes of the image and the feature information are equal to each other before the comparison between the color chart obtained by the image obtainment processor and the reference color chart using at least one of the image and the feature information. Preferably, in the colorimetry device, the determination processor adjusts the size by variably magnifying (expansion or reduction) one of the image and the feature information.

In the colorimetry device, because the sizes of the color chart and the reference color chart are adjusted even if the sizes of the color chart CT and the reference color chart differ from each other, the color chart can be compared to the reference color chart, and whether the color chart is matched with the reference color chart can more accurately be determined.

According to another aspect, in the colorimetry device, the determination processor adjusts a direction of at least one of the image and the feature information in the color chart obtained by the image obtainment processor and the reference color chart such that the directions of the image and the feature information are equal to each other before the comparison between the color chart obtained by the image obtainment processor and the reference color chart using at least one of the image and the feature information. Preferably, in the colorimetry device, the determination processor adjusts the direction by rotating one of the image and the feature information.

In the colorimetry device, because the directions of the color chart and the reference color chart are adjusted even if the directions of the color chart CT and the reference color chart differ from each other, the color chart can be compared to the reference color chart, and whether the color chart is matched with the reference color chart can more accurately be determined.

According to another aspect, the colorimetry device further includes a patch position processor that obtains patch position measurement information indicating the position of the patch based on the image of the color chart obtained by the image obtainment processor. When the determination processor determines that the color chart is not matched with the reference color chart, the color measurement processor relatively moves the position of the colorimetry unit with respect to the color chart to the position of each of the plurality of patches using the movement unit, based on the patch position measurement information obtained by the patch position processor, and measures color of each of the plurality of patches using the colorimetry unit.

In the colorimetry device, because the patch position processor is further included, the colorimetry of each patch can be performed at a proper position even in the color chart of a kind that is not prepared as the reference color chart.

According to another aspect, the colorimetry device further includes a reference chart information obtainment unit that obtains the reference chart identification information and the reference chart definition information from an outside instead of or in addition to the reference chart information storage unit. Preferably, in the colorimetry device, the reference chart information obtainment unit is a communication interface circuit that transmits and receives the communication signal to and from the external device through the communication line (network). Preferably, in the colorimetry device, the reference chart information obtainment unit is an interface circuit that inputs and outputs the data to and from the external device. Preferably, in the colorimetry device, the reference chart information obtainment unit is a drive that writes and reads the data in and from a predetermined recording medium.

In the colorimetry device, because the reference chart information obtainment unit can obtain the reference chart identification information and the reference chart definition information from the outside. Therefore, the reference chart information storage unit can be eliminated or the storage capacity of the reference chart information storage unit can be decreased. Even after the colorimetry device is released, a manufacturer can provide the reference chart identification information and the reference chart definition information to a user through a storage medium or a network.

According to an aspect, a colorimetry method for a colorimetry device including: a colorimetry unit that measures color; an imaging unit that obtains an image; a movement unit that relatively moves a position of the colorimetry unit with respect to the sheet of the measurement object; a control processor that controls the colorimetry unit, the imaging unit, and the movement unit; and a reference chart information storage unit in which reference chart definition information is stored, the reference chart definition information including at least reference chart identification information and patch position definition information, the reference chart identification information identifying and specifying a reference color chart including a plurality of patches each of which is a region of a predetermined color, the patch position definition information indicating a position of each of the plurality of patches in the reference color chart, the colorimetry method includes: an image obtainment processing step of obtaining an image of a color chart including a plurality of patches each of which is a region of a predetermined color using the imaging unit; a determination processing step of determining whether the color chart obtained in the image obtainment processing step is matched with the reference color chart based on the reference chart identification information stored in the reference chart information storage unit; and a color measurement processing step of, when the determination that the color chart is matched with the reference color chart is made in the determination processing step, moving relatively the position of the colorimetry unit with respect to the color chart to the position of each of the plurality of patches using the movement unit based on the reference chart definition information stored in the reference chart information storage unit, and measuring color of each of the plurality of patches using the colorimetry unit.

According to another aspect, a colorimetry method for a colorimetry device including: a colorimetry unit that measures color; an imaging unit that obtains an image; a movement unit that relatively moves a position of the colorimetry unit with respect to the sheet of the measurement object; a control processor that controls the colorimetry unit, the imaging unit, and the movement unit; and a reference chart information obtainment unit that obtains reference chart definition information from an outside, the reference chart definition information including at least reference chart identification information and patch position definition information, the reference chart identification information identifying and specifying a reference color chart including a plurality of patches each of which is a region of a predetermined color, the patch position definition information indicating a position of each of the plurality of patches in the reference color chart, the colorimetry method includes: a reference chart information obtainment step of obtaining the reference chart identification information and the reference chart definition information from the outside using the reference chart information obtainment unit; an image obtainment processing step of obtaining an image of a color chart including a plurality of patches each of which is a region of a predetermined color using the imaging unit; a determination processing step of determining whether the color chart obtained in the image obtainment processing step is matched with the reference color chart based on the reference chart identification information obtained by the reference chart information obtainment unit; and a color measurement processing step of, when the determination that the color chart is matched with the reference color chart is made in the determination processing step, moving relatively the position of the colorimetry unit with respect to the color chart to the position of each of the plurality of patches using the movement unit based on the reference chart definition information obtained by the reference chart information obtainment unit, and measuring color of each of the plurality of patches using the colorimetry unit.

In the colorimetry method, the reference chart identification information and reference chart definition information in the reference color chart are previously prepared, the movement unit relatively moves the position of the colorimetry unit with respect to the color chart to each of the plurality of patch positions in the color chart based on the reference chart definition information when the color chart obtained in the image obtainment processing step is determined to be matched with the reference color chart, and the colorimetry unit measures the color of each of the plurality of patches. Accordingly, even in the color chart in which all the patch positions are difficult to automatically recognize, the chart definition information is generated by performing the automatic recognition and the correction once, or the chart definition information is generated by hand from the beginning, and the color chart and the chart definition information are set to the reference color chart and the reference chart definition information. Therefore, in the colorimetry method, the colorimetry of each patch can be performed at a more proper position in the color chart in which all the patch positions are difficult to automatically recognize and the substantially identical color chart.

This application is based on and claims the benefit of priority from Japanese Patent Application No. 2015-75144, filed on Apr. 1, 2015, the entire contents of which are incorporated herein by reference.

While the embodiment of the present invention is properly and adequately described with reference to the drawings, it is noted that those skilled in the art can easily change and/or modify the embodiment. Accordingly, as long as the change or modification made by those skilled in the art does not depart from the scope of the present invention, the change or modification is included in the scope of the present invention.

INDUSTRIAL APPLICABILITY

The present invention can provide the colorimetry device and the colorimetry method.

The invention claimed is:

1. A colorimetry device comprising:
a colorimetry unit that measures color;
an imaging unit that obtains an image;
a movement unit that relatively moves a position of the colorimetry unit with respect to a sheet of a measurement object;
a reference chart information storage unit in which reference chart definition information is stored, the reference chart definition information including at least reference chart identification information and patch position definition information, the reference chart identification information identifying and specifying a reference color chart including a plurality of patches each of which is a region of a predetermined color, the patch position definition information indicating a position of each of the plurality of patches in the reference color chart;
an image obtainment processor that obtains an image of a color chart including a plurality of patches each of which is a region of a predetermined color using the imaging unit;
a determination processor that determines whether the color chart obtained by the image obtainment processor is matched with the reference color chart based on the reference chart identification information; and
a color measurement processor that, when the determination processor determines that the color chart is matched with the reference color chart, relatively moves the position of the colorimetry unit with respect to the color chart to the position of each of the plurality of patches using the movement unit based on the reference chart definition information, and measures color of each of the plurality of patches using the colorimetry unit.

2. The colorimetry device according to claim 1, wherein the reference chart identification information is at least one of an image of the reference color chart and feature information indicating a feature of the reference color chart, and
the determination processor determines whether the color chart obtained by the image obtainment processor is matched with the reference color chart based on a result of comparison between the color chart obtained by the image obtainment processor and the reference color chart using at least one of the image and the feature information.

3. The colorimetry device according to claim 2, wherein the determination processor adjusts a size of at least one of the image and the feature information in the color chart obtained by the image obtainment processor and the reference color chart such that the sizes of the image and the feature information are equal to each other before the comparison between the color chart obtained by the image obtainment processor and the reference color chart using at least one of the image and the feature information.

4. The colorimetry device according to claim 2, wherein the determination processor adjusts a direction of at least one of the image and the feature information in the color chart obtained by the image obtainment processor and the reference color chart such that the directions of the image and the feature information are equal to each other before the comparison between the color chart obtained by the image obtainment processor and the reference color chart using at least one of the image and the feature information.

5. The colorimetry device according to claim 1, further comprising:
a patch position processor that obtains patch position measurement information indicating the position of the patch based on the image of the color chart obtained by the image obtainment processor,
wherein when the determination processor determines that the color chart is not matched with the reference color chart, the color measurement processor relatively moves the position of the colorimetry unit with respect to the color chart to the position of each of the plurality of patches, using the movement unit, based on the patch position measurement information obtained by the patch position processor, and measures color of each of the plurality of patches using the colorimetry unit.

6. The colorimetry device according to claim 1, further comprising:
a reference chart information obtainment unit that obtains the reference chart identification information and the reference chart definition information from an outside instead of or in addition to the reference chart information storage unit.

7. A colorimetry method for a colorimetry device, the colorimetry device including: a colorimetry unit that measures color; an imaging unit that obtains an image; a movement unit that relatively moves a position of the colorimetry unit with respect to a sheet of a measurement object; a control processor that controls the colorimetry unit, the imaging unit, and the movement unit; and a reference chart information storage unit in which reference chart definition information is stored, the reference chart definition information including at least reference chart identification information and patch position definition information, the reference chart identification information identifying and specifying a reference color chart including a plurality of patches each of which is a region of a predetermined color, the patch position definition information indicating a position of each of the plurality of patches in the reference color chart,
wherein the colorimetry method comprises:
an image obtainment processing step of obtaining an image of a color chart including a plurality of patches each of which is a region of a predetermined color using the imaging unit;
a determination processing step of determining whether the color chart obtained in the image obtainment processing step is matched with the reference color chart based on the reference chart identification information stored in the reference chart information storage unit; and
a color measurement processing step of, when the determination that the color chart is matched with the reference color chart is made in the determination processing step, moving relatively the position of the colorimetry unit with respect to the color chart to the position of each of the plurality of patches using the movement unit based on the reference chart definition information stored in the reference chart information storage unit, and measuring color of each of the plurality of patches using the colorimetry unit.

8. A colorimetry method for a colorimetry device, the colorimetry device including: a colorimetry unit that measures color; an imaging unit that obtains an image; a movement unit that relatively moves a position of the colorimetry unit with respect to a sheet of a measurement object; a control processor that controls the colorimetry unit, the imaging unit, and the movement unit; and a reference chart information obtainment unit that obtains reference chart definition information from an outside, the reference chart definition information including at least reference chart identification information and patch position definition information, the reference chart identification information identifying and specifying a reference color chart including a plurality of patches each of which is a region of a predetermined color, the patch position definition information indicating a position of each of the plurality of patches in the reference color chart, wherein the colorimetry method comprises:

a reference chart information obtainment step of obtaining the reference chart identification information and the reference chart definition information from the outside using the reference chart information obtainment unit;

an image obtainment processing step of obtaining an image of a color chart including a plurality of patches each of which is a region of a predetermined color using the imaging unit;

a determination processing step of determining whether the color chart obtained in the image obtainment processing step is matched with the reference color chart based on the reference chart identification information obtained by the reference chart information obtainment unit; and a color measurement processing step of, when the determination that the color chart is matched with the reference color chart is made in the determination processing step, moving relatively the position of the colorimetry unit with respect to the color chart to the position of each of the plurality of patches using the movement unit based on the reference chart definition information obtained by the reference chart information obtainment unit, and measuring color of each of the plurality of patches using the colorimetry unit.

* * * * *